United States Patent [19]

Boyd et al.

[11] Patent Number: 4,918,699
[45] Date of Patent: Apr. 17, 1990

[54] SYSTEM FOR COMBINING LASER BEAM BY TRANSFER OF ENERGY THEREBETWEEN IN ATOMIC VAPOR

[76] Inventors: Robert W. Boyd, 149 Irving Rd., Rochester, N.Y. 14618; Alexander L. Gaeta, 13 Lilac Dr., Apt. #12, Rochester, N.Y. 14620; Mark T. Gruneisen, 5330 San Mateo Blvd., N.E., #F85, Albuquerque, N. Mex. 87109; Kenneth R. MacDonald, 7 Puntilla Dr., Tijeras, N. Mex. 87059

[21] Appl. No.: 358,120

[22] Filed: May 30, 1989

[51] Int. Cl.$^4$ ............................................. H01S 3/10
[52] U.S. Cl. ..................................... 372/21; 372/108; 350/354; 356/349
[58] Field of Search ................... 372/21, 108; 350/354; 356/349

[56] References Cited

U.S. PATENT DOCUMENTS

| | | | |
|---|---|---|---|
| 4,761,059 | 8/1988 | Yeh et al. | 372/21 |
| 4,778,261 | 10/1988 | Boyd et al. | 372/21 |
| 4,784,473 | 11/1988 | Gookin | 372/21 |
| 4,847,521 | 7/1989 | Huignard et al. | 372/21 |

OTHER PUBLICATIONS

C. Cohen-Tannoudji and S. Reynaud, "Dressed Atom Description of Resonance Fluorescence and Absorption Spectra of a Multi-Level Atom in an Intense Laser Beam," J. Phys. B 10, 345-363, (1977).
"Modification of Resonance Raman Scattering in Very-Intense Laser Fields," J. Phys. B 10, 365-383 (1977).
"Simultaneous Saturation of Two Atomic Transistions Sharing a Common Level," J. Phys., B 10, 2311-2331 (1977).
E. Courtens and A. Szoöke, "Time and Spectral Resolution in Resonance Scattering and Resonance Fluorescence," Phys. Rev. A 15, 1588-1693 (1977); errata, 17, 2119 (1978).
B. R. Mollow, "Stimulated Emission and Absorption Near Resonance for Driven Systems," Phys. Rev. A 5, 2217-2222 (1972).
R. W. Boyd, M. G. Raymer, P. Narum, and D. J. Harter, "Four-Wave Parametric Interactions in a Strongly Driven Two-Level System," Phys. Rev. A24, 411-423 (1981).
M. Sargent III, "Spectroscopic Techniques Based on Lamb's Theory," Phys. Rep. 43, 223-265 (1978).
S. E. Schwartz and T. Y. Tan, "Wave Interactions in Saturable Absorbers," Appl. Phys. Lett. 10, 4-7 (1967).
J. H. Lee, J. J. Song, M. A. F. Scarparo, and M. D. Levenson, "Coherent Population Oscillations and Hole Burning Observed in $Sm^{+2}$:$CaF_2$ Using Polarization Spectroscopy," Opt. Lett. 5, 196-198 (1980).
J. J. Song, J. H. Lee, and M. D. Levenson, "Picosecond Relaxation Measurements by Polarization Spectroscopy in Condensed Phases," Phys. Rev. A 17, 1439-1447 (1978).
L. W. Hillmann, R. W. Boyd, J. Krasinski, and C. R. Stroud, Jr., "Observation of a Spectral Hole Due To Population Oscillations in a Homogenously Broadened Optical Line," Opt. Commun. 45, 416-419 (1983).
M. S. Malcuit, R. W. Boyd, L. W. Hillman, J. Krasinski, and C. R. Stroud, Jr., "Saturation and Inverse-Saturation Absorption Line Shapes in Alexandrite," J. Opt. Soc. Am. B1, 73"75 (1984).
F. Y. Wu, S. Ezekiel, M. Ducloy, and B. R. Mollow, "Observation of Amplification in a Strongly Driven

(List continued on next page.)

Primary Examiner—William L. Sikes
Assistant Examiner—Robert E. Wise
Attorney, Agent, or Firm—Martin Lukacher

[57] ABSTRACT

Coherent transfer of laser energy between laser fields with high efficiency (85–95%) is obtained by energy coupling of nearly copropagating (intersecting) laser beams in mono-atomic vapor and provides an output beam of high power when nearly equal energy pulses are tuned near resonance with the transition of the atom of the vapor (e.g., potassium vapor at 230°–260° C.). The frequencies of the beams differ by approximately the inverse of the excited state lifetime of the atoms for optimum combining (coupling efficiency).

15 Claims, 8 Drawing Sheets

OTHER PUBLICATIONS

Two-Level Atomic System at Optical Frequencies," Phys. Rev. Lett. 38, 1077–1080 (1977).

M. T. Gruneisen, K. R. MacDonald, and R. W. Boyd, "Induced Gain and Modified Absorption of a Weak Probe Beam in a Strongly Driven Sodium Vapor," J. Opt. Soc. Am. B 5, 123–129 (1988).

R. Gush and H. P. Gush, "Scattering of Intense Light by a Two-Level System," Phys. Rev. A 6, 129–140 (1972).

N. Tsukada, "Saturation Effects of a Two-Level System in Two RF Fields," J. Phys. Soc. Jpn. 46, 1280–1287 (1979).

A. M. Bonch-Bruevich, T. A. Vartanyan, and N. A. Chigir, "Subradiative Structure in the Absorption Spectrum of a Two-Level System in a Biharmonic Radiation Field," Sov. Phys. JETP 50, 901–906 (1979).

N. Tsukada and T. Nakayama, "Modulation of Optical Bistability by an Additional Laser Beam," Phys. Rev. A 25, 964–977 (1982).

G. I. Toptygina and E. E. Fradkin, "Theory of Subradiative Absorption Structure in the Interaction Between Two Intense Waves in a Nonlinear Medium," Sov. Phys. JETP 55, 246–251 (1982).

G. S. Agarwal and N. Nayak, "Multiphoton Processes in Two-Level Atoms in Two Intense Pump Beams," J. Opt. Soc. Am. B 1, 164–168 (1984).

L. W. Hillman, J. Krasinski, K. Koch, and C. R. Stroud, Jr., "Dynamics of Homogeneously Broadened Lasers: Higher-Order Bichromatic States of Operation", J. Opt. Soc. Am. B 2, 211–217 (1985).

S. Chakmakjian, K. Koch and C. R. Stroud, Jr., "Observation of Resonances at Sub-Harmonics of the Rabi Frequency in the Saturated Absorption of a 100% Amplitude Modulated Laser Beam," J. Opt. Soc. Am. B 5, 2015–2020 (1988).

See, for example, J. C. Walling, O. G. Peterson, H. P. Jenssen, R. C. Morris, and E. W. O'Dell, "Tunable Alexandrite Lasers", IEEE J. Quantum Electron. QE—16, 1302–1314 (1980).

SYSTEM FOR COMBINING LASER BEAM BY TRANSFER OF ENERGY THEREBETWEEN IN ATOMIC VAPOR

The U.S. government has rights in this invention as a result of a contract between the University of Rochester and the Office of Naval Research. The sponsors of the New York State Center for Advanced Optical Technology also have rights in this invention.

INTRODUCTION

The present invention relates to a system (method and apparatus) for combining laser beams and particularly to a system in which energy is transferred between laser beams by non-linear interaction in an atomic vapor.

This invention is especially suitable for the generation of laser beams of extremely high power, and particularly where it is more desirable or practical to achieve a required total power level through the use of a plurality of smaller lasers, rather than a single high power laser. Aspects of the invention are useful generally whenever it is necessary or desirable to couple energy from one laser beam to the other.

BACKGROUND

Attached hereto and forming a part hereof is a list of references. The references are enumerated and are referred to in the text by their numbers (1, 2, 3 . . . etc.).

Laser beams have been combined interferometrically, but to do so all output beams must maintain a fixed phase relationship. The complexity of such interferometric techniques has precluded their practical use.

Nonlinear, photo-refractive materials have also been suggested for laser beam combining, but they are limited to low intensity of illumination (a few watts per $cm^2$).

Raman beam combining in molecular gases has also been suggested, but has drawbacks such as breakdown of the gas under intense laser fields and a large frequency shift ($10^{13}$ Hz) due to the Raman effect. The present invention is believed to operate (although no limitation to any particular theory of operation is intended by this reference) by a stimulated Rayleigh scattering mechanism which imposes a much smaller frequency shift ($3 \times 10^6$ Hz) in the combined, intense output beam and is not as subject to breakdown in the medium in which transfer of energy (beam combining) occurs. Even then, the medium will heal, should breakdown occur.

It is known that that interaction of a single intense laser field with a two-level atom modifies the energy level structure of the atom. This modification is conveniently described in terms of "dressed" atomic states.[1] Transitions among the dressed states give rise to resonances in the atomic response, some of which can lead to amplification of a weak probe wave. Mollow[2] has calculated the weak-probe-wave absorption spectrum of a strongly driven collection of atoms and predicts three spectral features, two of which can lead to amplification of the probe wave. One of these gain features occurs when the probe is detuned by the generalized Rabi frequency and is known as stimulated three-photon scattering. The other gain feature occurs when pump wave is detuned from the pump wave by the inverse of the lifetime of the excited state and is a form of stimulated Rayleigh scattering.[3-9] Wu et al.[10] observed this predicted absorption spectrum using a sodium atomic beam as the two-level system. More recently,[11] the inventors hereof have shown that both the Rabi-sideband and Rayleigh resonances can give rise to large amplification of a weak probe wave in sodium vapor, where the atomic number density can be much higher than in an atomic beam. In particular, they reported 38- and 4-fold increases in the probe intensity at the Rabi-sideband then Rayleigh resonances, respectively, in a 7-mm interaction length. The inventors have discovered that high gain near the Rabi-sideband and Rayleigh resonances in the weak-probe wave is comparable to that of the strong pump wave, and efficient coupling interaction occurs in a two-level system in the presence of two strong optical fields.

The interaction of a two-level system with two strong fields has been considered in a number of previous investigation.[12-17] Gush and Gush[12] and Tsukada[13] used continued-fraction techniques to solve the density-matrix equations of motion for the interaction of two strong rf magnetic fields with a two-level system. Bonch-Breuvish et al.[14] presented a theory for the case of a pump field tuned exactly to resonance and equal pump and probe intensities which predicts resonances in the probe transmission whenever the probe-pump detuning is equal to a subharmonic of the Rabi frequency. In addition, they demonstrated that the interaction of strong rf magnetic fields with cadmium vapor agreed with the results of their theory. The existence of subharmonic resonances in the probe absorption spectrum are also predicted in the interaction of a two-level atom with two electromagnetic fields of arbitrary intensities and frequencies.[15,16] In addition, Tsukada and Nakayama[15] showed that the Rayleigh resonance is present when the pump fields are tuned off-resonance. Agarwal and Nayak[17] showed theoretically that the strength of the subharmonic resonances decreases rapidly as the laser bandwidth increases. Experimental studies of the interaction of two intense optical fields with a two-level system include that of Hillman et al.,[18] and that of Chakmakjian et al.,[19] who observed subharmonic resonances in the response of a sodium atomic beam driven by a 100%-amplitude-modulated exciting field.

SUMMARY OF THE INVENTION

It has been found in accordance with the invention that coupling occurs between two strong waves of comparable intensity as they propagate through an atomic vapor. It is believed that when the effects of atomic motion and the spatial variation of the intensities of each wave are taken into account, the Rayleigh resonance can be the dominant spectral feature, and furthermore, that the Rayleigh resonance can give rise to efficient coupling between two waves of comparable intensity. Experimentally, in an exemplary system using the output of a pulsed alexandrite laser tuned near resonance in potassium vapor with equal input pulse energies, a maximum coupling efficiency was measured that corresponds to one output wave containing as much as 85% of the total incident optical energy.

It is the principal object of the invention to provide an improved system for combining the energy of laser beams to provide an output beam which is more intense than the input beams.

It is a further object of the invention to provide an improved system for combining beams in a medium having a nonlinear response to optical input energy and particularly where the medium is an atomic vapor.

It is a still further object of the invention to provide an improved system for energy transfer between laser pulses in an atomic vapor by copropagating beams tuned approximately to a transition between allowed excited energy levels (states) of the atoms of the vapor, the beams differing in frequency by the inverse of the excited lifetime of these states.

Briefly described, the invention may be carried out by copropagating laser beams, preferably of comparable intensity, through an atomic medium, such as an atomic vapor. The beams are preferably sufficiently intense to saturate the atomic medium. The beams cross in the medium preferably at an angle of at least about 0.6°. The beams each are of a frequency nearly corresponding to (are tuned to resonance at) the transition between two states, one of which is a populated state state, of the medium. The beams differ in frequency by approximately the inverse of the excited state lifetime. Nonlinear interaction of the beams in the medium results in efficient transfer of energy. One of the beams transmitted through the medium has almost all (85–95%) of the total incident energy of both beams.

The foregoing and other objects, features and advantages of the invention will become more apparent from a reading of the following description in connection with the accompanying drawings.

BRIEF DESCRIPTION OF THE DRAWINGS

FIG. 2 are curves showing the probe-wave absorption coefficient versus probe-pump detuning for several values of the probe-pump intensity ratio. In these curves, the pump intensity $I_1$ is $5 \times 10^3$ times the saturation intensity, the pump detuning from resonance is $\Delta_1 T_1 = -25$, and the transition is assumed to be radiatively broadened ($T_2/T_1 = 2$). Curve (a) shows the case when the probe intensity is much lower than both the pump intensity and the saturation intensity, the spectrum consists of three features: gain at one Rabi sideband; the Rayleigh resonance, centered at the pump frequency, which is barely visible on this scale; and strong absorption at the other Rabi sideband. Curve (b) shows the case when the probe intensity is much higher than the saturation intensity, but still lower than the pump intensity, new resonances appear at subharmonics of the generalised Rabi frequency. Curve (c) shows the case when the pump and probe intensities are equal, a large number of resonances at subharmonics of the generalized Rabi frequency appear. The insensitivity of the Rayleigh resonance to increased probe intensity makes it the strongest resonance in the spectrum for this case.

DETAILED DESCRIPTION

Theory

Figure 1:
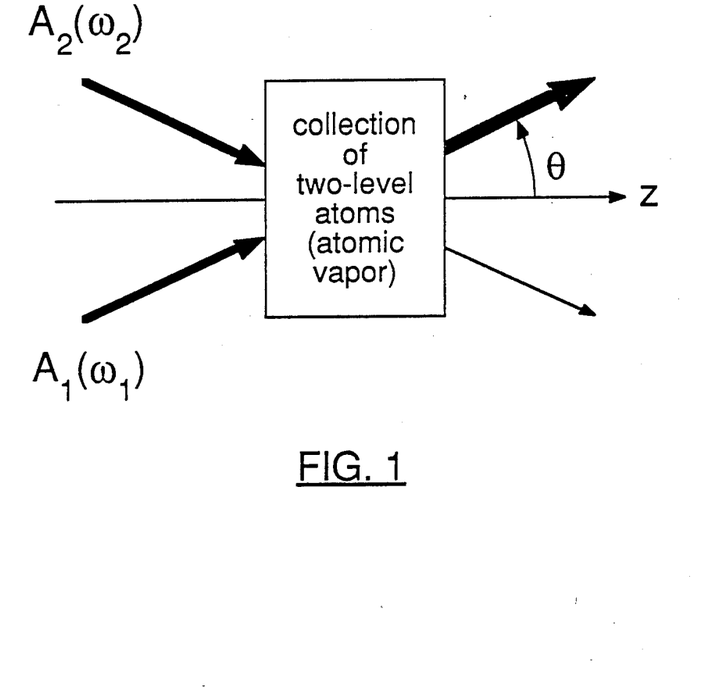
FIG. 1 is a schematic diagram of the system showing the interaction geometry thereof.

First, consider the process in which two monochromatic nearly copropagating laser beams are incident upon and are transmitted through with an atomic vapor, as shown in FIG. 1. We allow each beam to be sufficiently intense to strongly saturate the atomic medium. In the geometry illustrated in FIG. 1, two optical fields, due to the beams, which slowly varying amplitudes $A_1$ and $A_2$ was at angle $2\theta$ in a vapor of two-level atoms. The frequencies of the fields $\omega_1$ and $\omega_2$ are nearly resonant with the atomic transition frequency $\omega_0$, those conditions under which a substantial fraction of the power contained in one beam can be transferred to the other.

The coupled differential equations describing the spatial evolution of the intensities $I_1$ and $I_2$ of the two waves are derived in the Appendix, which follows this detailed description and forms a part thereof, and which waves have the form $$\frac{dI_j}{dz'} = -\alpha_j(I_1, I_2)I_j \qquad j = 1, 2 \qquad (1)$$

where $z' = z/\cos \theta$, and $\alpha_j$ is the effective absorption coefficients for the ith wave given by $$\alpha_j(I_j,I_2) = -N\sigma_0 w_0 \Lambda_1 \{1 - I_{3-j}[Re(L_1F) + \Delta_j T_2 Im\cdot (I_1F)]\}. \quad (2)$$

Here F is a continued fraction [Eq. (A17) in the Appendix] that depends on the intensities $I_1$ and $I_2$, on the detuning of the waves' frequencies from the atomic resonance frequency $\omega_o$, and on material parameters such as the saturation intensity $I_s$ and the relaxation times $T_1$ and $T_2$. The quantities $\Lambda_1$, $\Lambda_2$, and $L_1$ are detuning factors, $\Delta_1 = \omega_1 - \omega_o$ is the pump detuning from resonance, N is the atomic number density, $\sigma_o$ is the line-center intensity absorption cross-section, and $w_0$ is the spatially averaged, steady-state population inversion in the presence of the two waves. For convenience we denote the waves with intensities $I_1$ and $I_2$ as the pump and probe waves, respectively.

Figure 2:
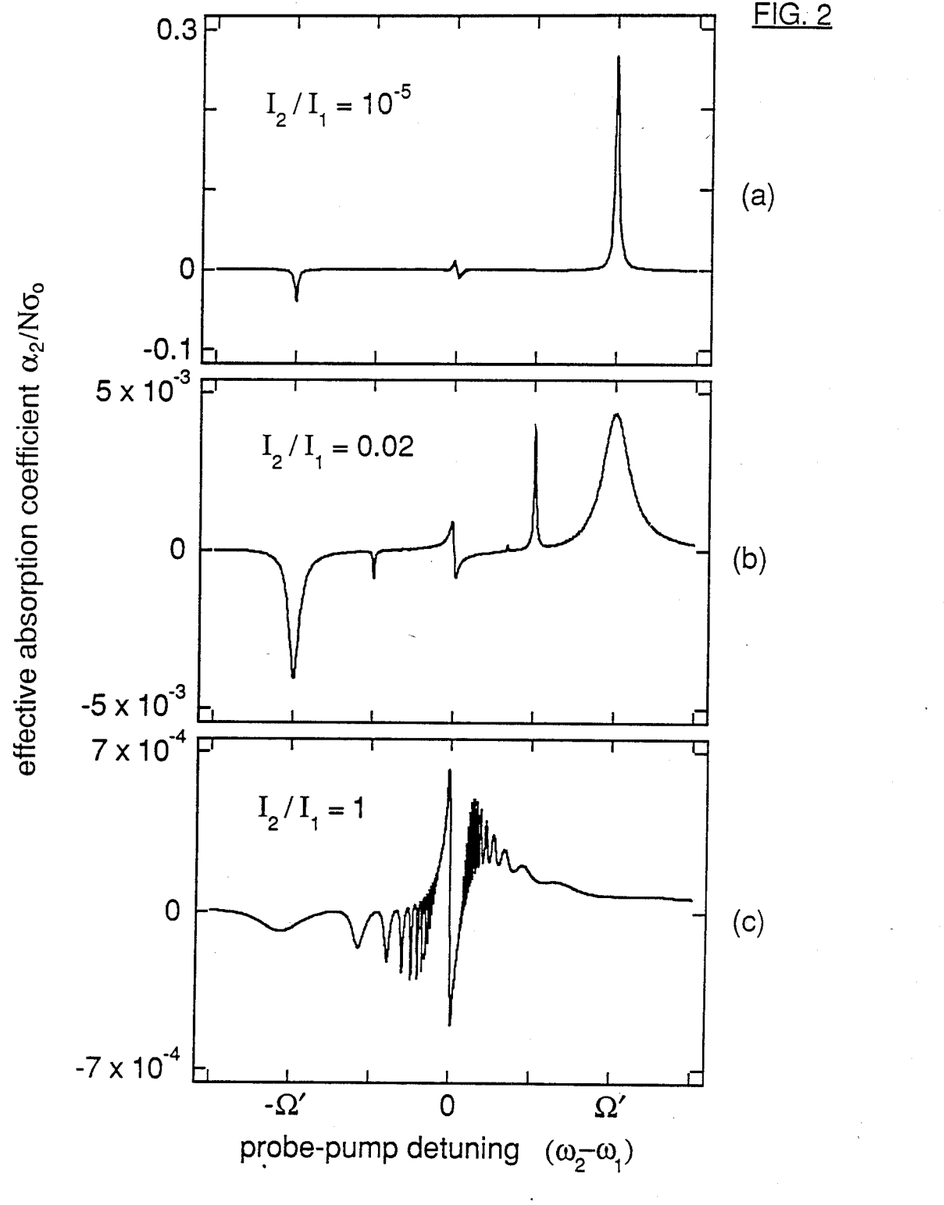

In FIG. 2, the effective probe-wave absorption coefficient $\alpha_2$, given by Eq. (2), is plotted as a function of the probe-pump detuning $\delta = \omega_2 - \omega_1$ for several values of the probe-pumping intensity ratio. The pump intensity $I_1$ is taken to be equal to $5 \times 10^3$ times the saturation intensity, the pump detuning from resonance $\Delta_1$ is given by $\Delta_1 T_1 = -25$, and the transition is assumed to be radiatively broadened ($T_2/T_1 = 2$). In curve (a) of FIG. 2, the probe intensity is much smaller than both the pump intensity and the saturation intensity. The two dominant spectral features occur at the Rabi sidebands, that is, for $\delta = \pm \Omega'$ where the generalized Rabi frequency is given by $\Omega' \equiv (\Delta^2 + \Omega^2)^{\frac{1}{2}}$, where $\Omega \equiv |\mu| E_1/\hbar$ is the on-resonance Rabi frequency, $\mu$ is the matrix element of the atomic-dipole operator between the ground and excited states, and $E_1$ is the (real) amplitude of the pump field. In this figure, the Rayleigh resonance (near $\delta = 0$) is barely visible on the scale of the Rabi-sideband resonances. In this limit the absorption spectrum is identical to that predicted by solving the density-matrix equations of motion to first order in the probe field amplitude.[4,11] When the probe intensity $I_2$ is much greater than the saturation intensity, but only a few percent of the pump intensity $I_1$[(b) of FIG. 2], new resonances in the probe transmission spectrum appear when the probe-pump detuning is a subharmonic of the generalized Rabi frequency. The principal consequences of increasing the probe intensity are to reduce the amplitude of the Rabi resonances and to broaden them. In the case shown here, the Rabi resonances and the Rayleigh resonance have comparable amplitudes, because the latter is relatively insensitive to probe intensity. When the probe and pump intensities are equal [(c) of FIG. 2], there are a large number of subharmonic resonances and the Rayleigh resonance has a larger amplitude than any of the Rabi-subharmonic resonances.

Figure 3:
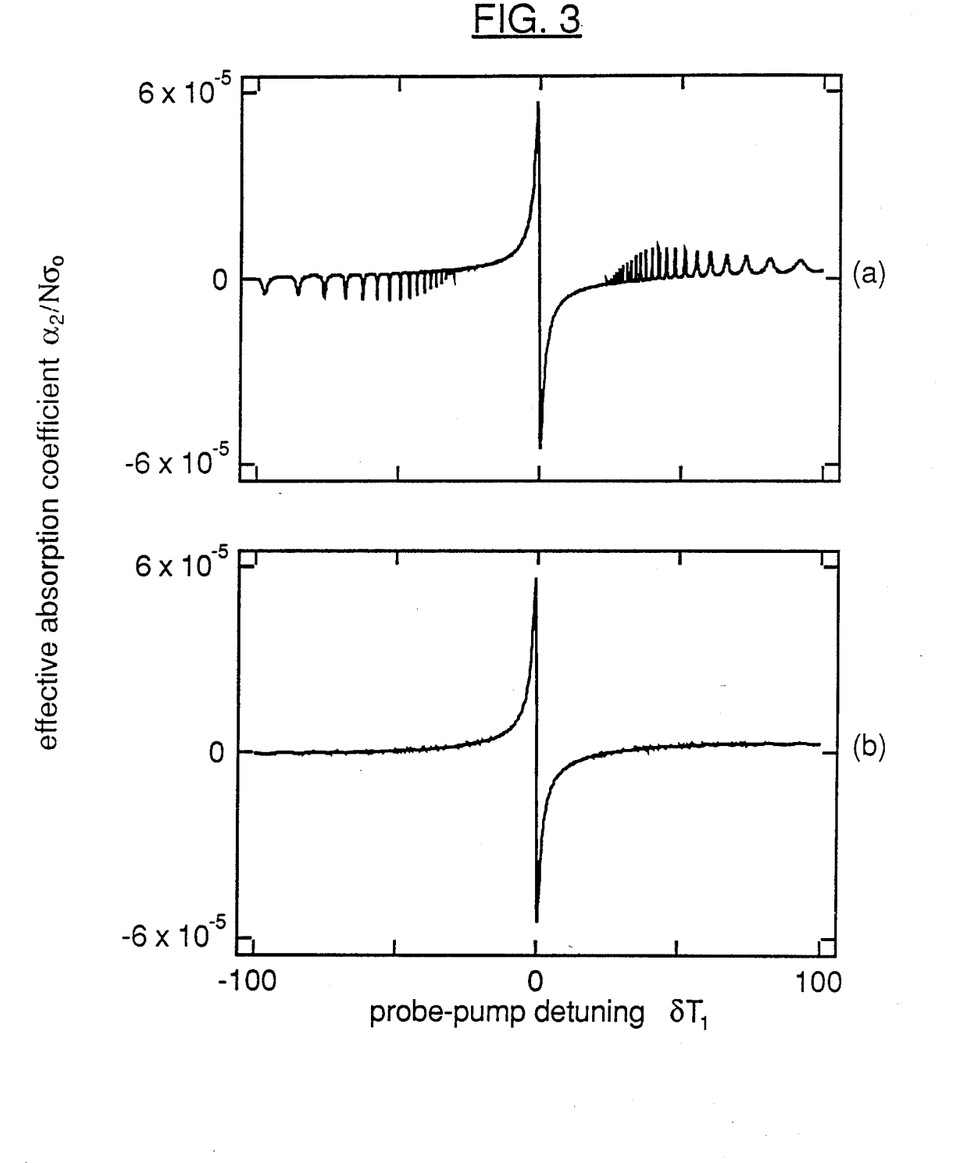
FIG. 3 are curves showing effective absorption coefficient for one of the beams versus probe-pump detuning without (in curve (a) and with in curve (b)) Doppler broadening. These curves are for equal input intensities, radiative broadening, a total input intensity $I_{total}(0) = 1 \times 10^6$ times the saturation intensity, and a normalized detuning from resonance of $\Delta_1 T_1 = -500$. In curve (b), the Maxwellian distribution of atomic velocities appropriate for a vapor of potassium atoms at 260° C. The curves shown that atomic motion completely washes out the resonances near the Rabi subharmonic frequencies, but does not affect the Rayleigh resonance.

The effects of atomic motion are illustrated for the case of copropagating waves in FIG. 3. In curve (a) of FIG. 3, the homogeneously broadened absorption coefficient $\alpha_2$ [Eq. (4)] is evaluated as a function of the normalized probe-pumping detuning $\delta T_1$ for the case of equal input intensities, radiative broadening, a total input intensity equal to $1 \times 10^6 I_s$, and a normalized detuning from resonance of $\Delta_1 T_1 = -500$. The scaling of the horizontal axis was chosen to show clearly the structure of the subharmonic resonances near zero relative detuning. In curve (b) of FIG. 3, the effective absorption coefficient shown in curve (a) of FIG. 3 is averaged over a Maxwellian distribution of atomic velocities. The Doppler width is taken to be 200 natural linewidths consistent with the conditions of the example described hereinafter. Doppler-averaging severely reduces the amplitudes of the subharmonic resonances because the generalized Rabi frequency depends on atomic velocity through Doppler shifts in the pump detuning from resonance $\Delta_1$. Consequently, the position of the Rabi resonances is different for each velocity group. In contrast, the Rayleigh-resonance lineshape is relatively insensitive to the pump detuning from resonance $\Delta_1$, but depends most on the probe-pumping detuning $\delta$ measured in the reference frame of the atom. Therefore, since the probe-pump detuning is independent of atomic velocity for copropagating beams, the Rayleigh resonance is not broadened by atomic motion.

Figure 4:
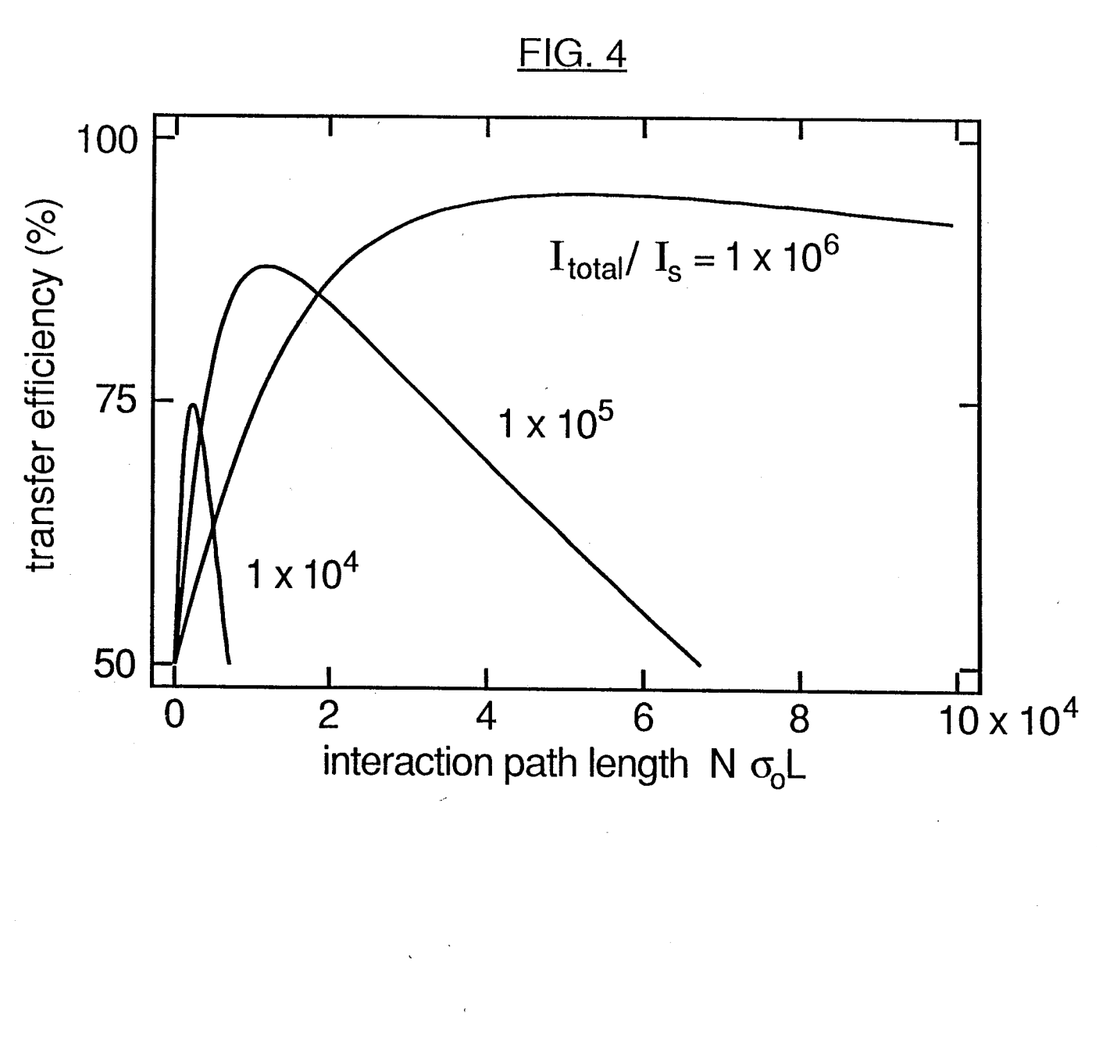
FIG. 4 is a curve showing the transfer efficiency at the peak of the Rayleigh resonance versus absorption path length for various values of the total incident intensity. The input waves have equal intensities and the transition is radiatively broadened ($T_2/T_1 = 2$). The curve shows that as the incident intensity increases, the maximum coupling increases and occurs for a larger absorption path length in the atomic vapor. Transfer efficiencies as high as 95% are indicated. For each value of the incident intensity, the laser detuning from resonance $\Delta_1$ is taken to be equal to one-half of the Rabi frequency for one of the input waves, which is approximately the optimum value.

The effects of propagation are included by integrating Eq. (1) numerically. We define the power transfer efficiency as the fraction of the total incident power that is contained in one of the output waves. In FIG. 4, the power transfer efficiency, evaluated at the peak of the Rayleigh resonance, is plotted as a function of interaction path length $N\sigma_o L$ for various values of the total input intensity. We assume the case of equal input intensities, radiative broadening, and copropagating waves. For each plot the detuning of the pump wave from resonance $\Delta_1$ is taken to be one-half of the Rabi frequency $\Omega$ associated with one input wave. We have observed (from computer calculations that this detuning is nearly. This detuning is nearly optimal because it corresponds to the best compromise between enhancement of the nonlinearity which occurs near resonance and decreased absorption which occurs far from resonance. As the total input intensity increases, the maximum power transfer efficiency increases and occurs at a higher value of $N\sigma_o L$. Note that the calculated coupling efficiency is ~95% when the total input intensity is equal to $1 \times 10^6 I_s$ and the interaction path length is $\sim 5 \times 10^4$.

EXAMPLE

Figure 5:
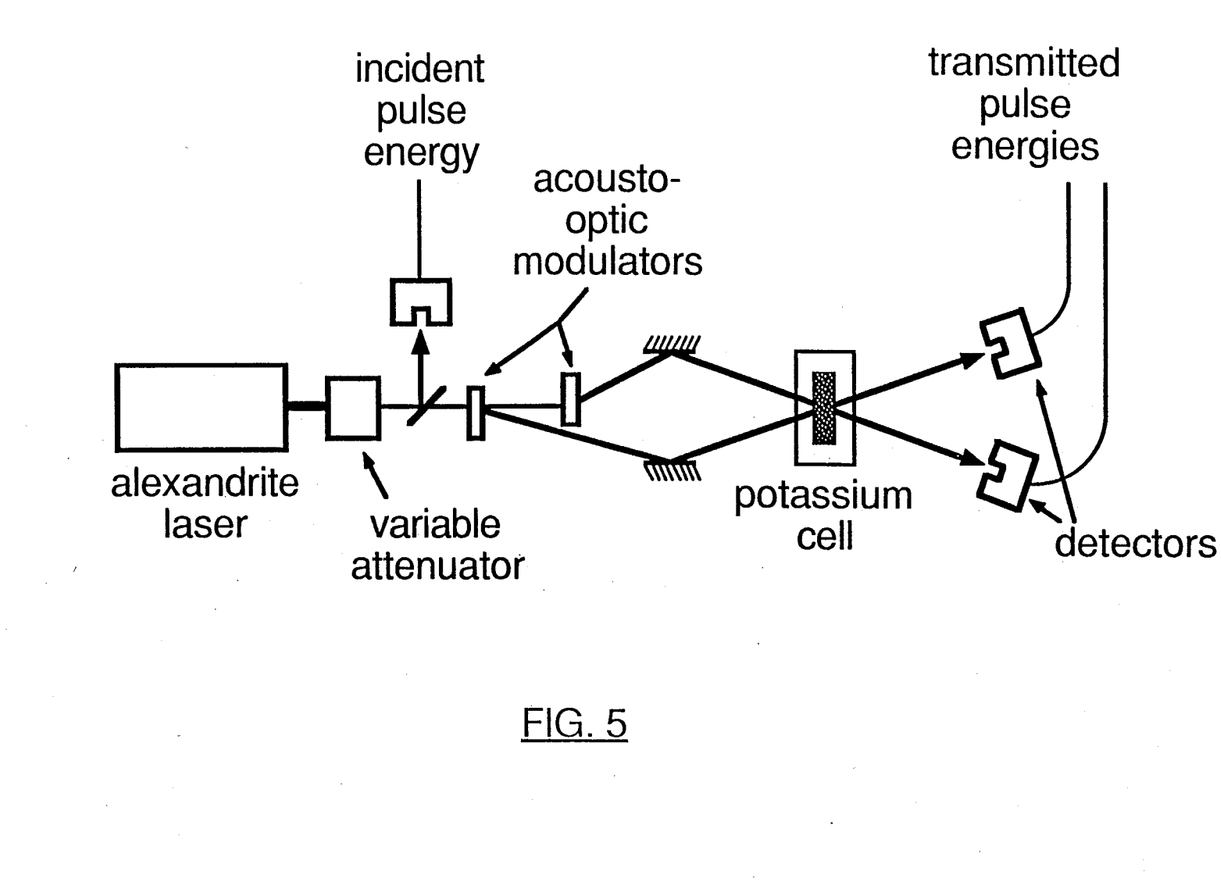
FIG. 5 is a schematic diagram of the exemplary system wherein the output of a pulsed alexandrite laser is split into two beams with variable frequencies by a pair of independently controllable acousto-optic modulators. The two beams intersect in a cell containing a vapor of potassium atoms. The transmitted energies of the beams is monitored with large-area integrating detectors.

Referring to FIG. 5, a pulsed alexandrite laser[20] is tuned near resonance with the potassium $4^2S_{\frac{1}{2}} \rightarrow 4^2P_{3/2}$ transition using a four-plate birefringent filter and a 1-mm-thick étalon. The detuning of the laser frequency from resonance was monitored using a $\frac{3}{4}$-meter Czerny-Turner spectrometer in conjunction with a linear detector array and optical multichannel analyzer (not shown). The output spectrum of the laser typically consists of two longitudinal modes. The data in FIGS. 6–7 were measured with the laser free-running; the data shown in FIG. 8 were obtained with a Q-switched oscillator, so that each data pair represents the energy coupling experienced by a single laser pulse. The temporal output of the free-running laser consists of a train of 2–5 pulses, each approximately 1 $\mu$s in duration and having an average pulse energy of about 150 $\mu$J. When the alexandrite laser is Q-switched, it produces a single output pulse of 500 ns duration and an average energy of about 150 $\mu$J. The corresponding peak laser intensity at the potassium cell is approximately $2 \times 10^6$ times the line-center saturation intensity (2.8 mW/cm$^2$) for this transition in potassium.

In order to produce two beams with the necessary relative frequency detuning, the laser output is passed through two variable-frequency, traveling-wave, acousto-optic modulators. Since each modulator can be tuned over a 40 MHz range about its nominal operating frequency of 80 MHz, this arrangement permitted us to vary the relative detuning of the two diffracted beams to be varied over a range much larger than the 3-MHz width of the Rayleigh resonance. The first-order-diffracted components from the acousto-optic modulators are brought together (propagate over intersecting paths) in a 7-mm-long potassium-vapor cell consisting of a stainless-steel body and sidearm. The sidearm temperature was typically between 230° and 260° C., corresponding to a potassium number density of $10^{14}$–$10^{15}$ atoms/cm$^3$. Polarization distortions are minimized by using zero-degree-oriented sapphire windows to the cell at near-normal incidence.

It was observed that the measured transfer efficiency depends critically upon crossing angle of the beams in the potassium cell. The strength of the Rayleigh resonance is known theoretically to be largest for a zero beam-crossing angle and decreases rapidly with increasing crossing angle due to the effects of atomic motion.[11] However, at small cross angles, Raman-Nath scattering into higher orders causes a substantial loss of energy in the two transmitted beams. We have determined experimentally that the smallest crossing angle for which Raman-Nath scattering did not significantly degrade the coupling efficiency was ~0.6°.

The total peak intensity incident on the cell was varied from 1 W/cm$^2$ to 2 kW/cm$^2$ with a variable attenuator consisting of a rotatable half-wave plate and a linear polarizer. The integrated energy of each transmitted beam, as well as the total input energy, was recorded for each laser shot using large-area photodiodes (the detectors) and an analog-to-digital converter, and a laboratory computer (not shown). The energy transfer efficiency measured in the experiments is defined as the fraction of the total incident pulse energy contained in one of the output pulses. All of the data in FIGS. 6–8 were obtained using input pulses of equal energy.

Figure 6:
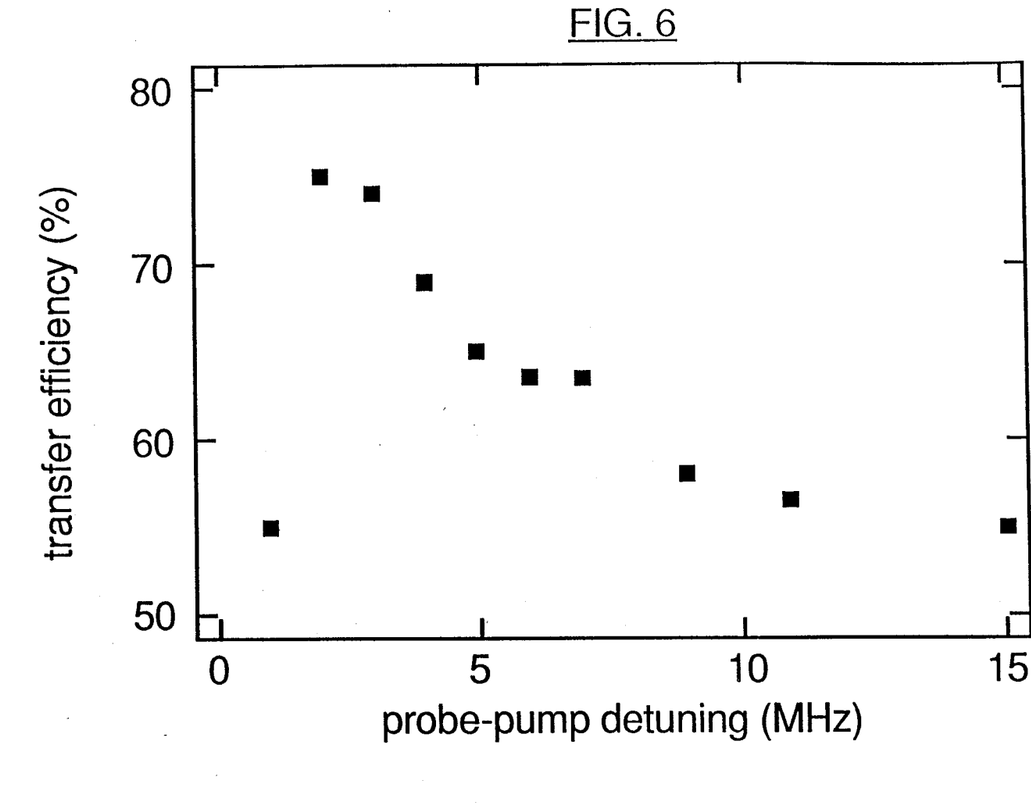
FIG. 6 is a plot of energy transfer efficiency versus the relative detuning of the two input beams. In the example described in detail herein the detuning of the pump beam from the atomic resonance frequency is $-21$ GHz, and the incident laser pulses have equal energy.

The dependence of the energy transfer efficiency on the relative detuning of the two input beams is plotted in FIG. 6. The pump was detuned from the stationary-atom resonance frequency by $-21$ GHz (that is, 21 GHz toward the red end of the spectrum) with the body of the vapor-cell held at a temperature of ~240° C. The maximum coupling efficiency occurred when the frequency of the pump beam was ~3 MHz.

Figure 7:
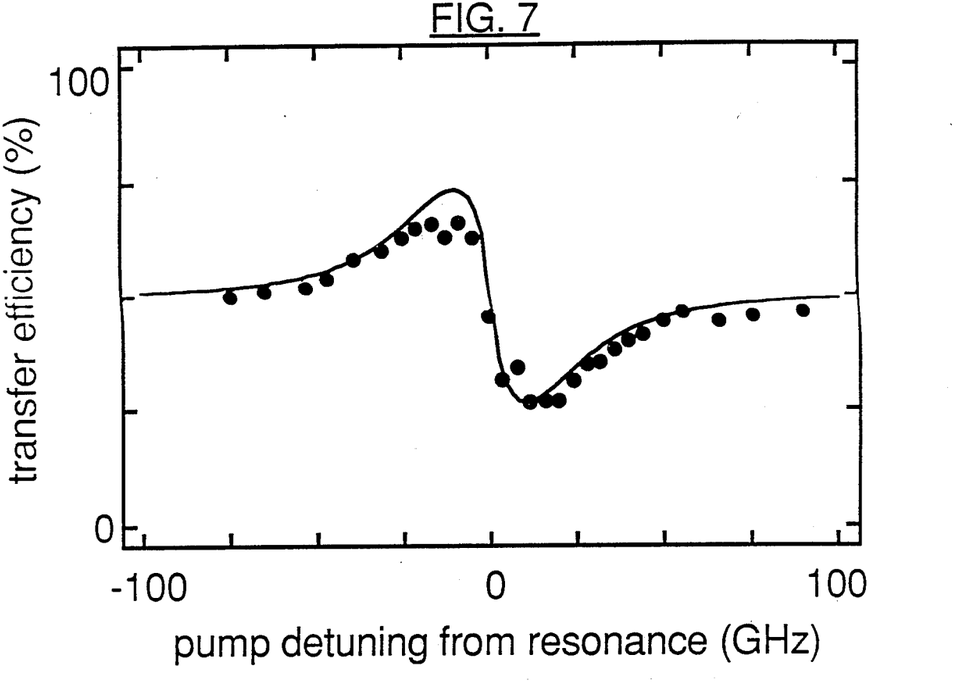
FIG. 7 is a plot showing dependence of the energy transfer efficiency on the pump detuning from resonance. In the exemplary case depicted, the probe-pumping detuning is 3 MHz to optimize the transfer efficiency. The solid curve gives the best fit to the experimental data.

In FIG. 7, the dependence of the coupling efficiency on the detuning of the laser from the atomic resonance frequency is shown. The probe-pump detuning was 3 MHz, which optimizes the coupling efficiency as observed in FIG. 6. These data were obtained with potassium vapor at a temperature of ~230° C. The solid curve gives the best fit to the experimental data.

Figure 8:
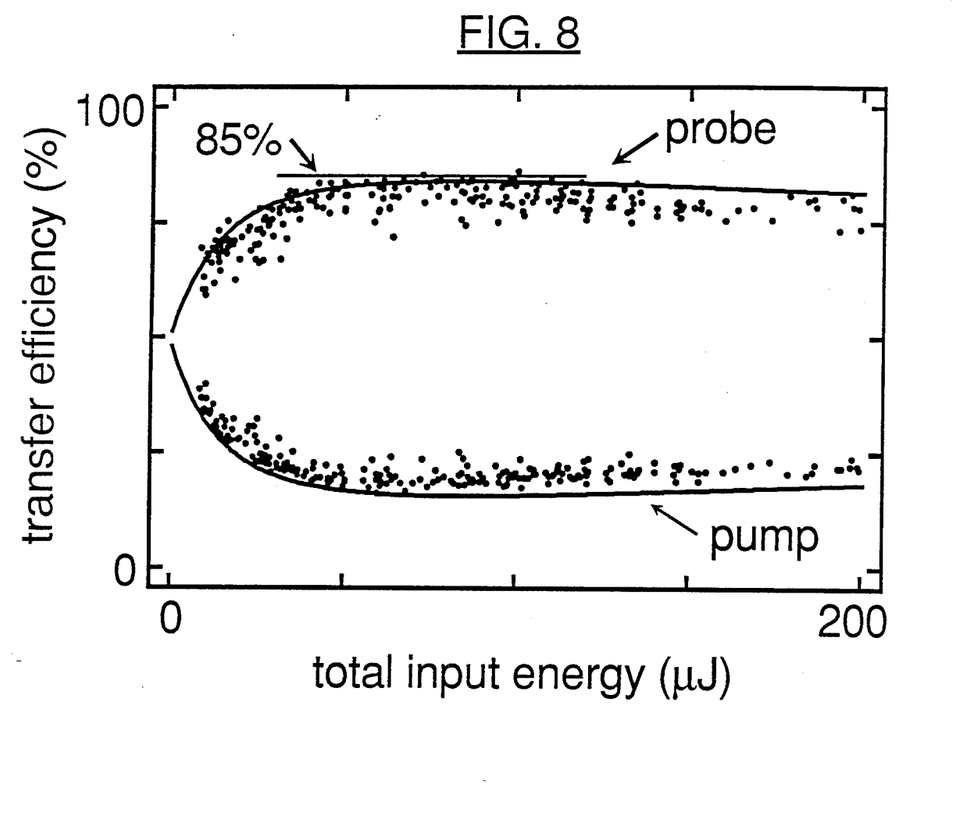
FIG. 8 is a plot showing the fraction of the total input energy leaving in each of the output beams versus the total input energy. In the exemplary case the probe-pump detuning is 3 MHz, and the laser is detuned from resonance by $-38$ GHz. The plot shows that for a total input energy of $\sim 75$ $\mu$J, as much as 85% of the total incident energy was contained in one of the output beams. The solid curves give the best fit to the experimental data.

The fraction of the total input energy contained in each transmitted beam is plotted in FIG. 8 versus the total incident energy. The two beams were detuned from each other by 3 MHz, the laser was detuned from the atomic resonance by $-38$ GHz, and the potassium-cell temperature was ~260° C. Note that for total input pulse energies on the order of 100 μJ, as much as 85% of the total incident energy was contained in one of the transmitted beams. The solid curves give the best fit to the experimental data.

The largest measured coupling efficiency of ~85% (FIG. 8) represents a substantial energy transfer from one laser beam to the other. However, the theoretical results shown in FIG. 4 suggest that a transfer efficiency of ~95% can be obtained.

Finally, the interpretation of the experimental situation is complicated by the unavoidable presence of self-focusing and defocusing. On the self-focusing side of resonance, we were not able to measure transfer efficiencies as large as those measured on the self-defocusing side of resonance. The break-up of the beams due to self-focusing probably reduces the length over which the beams interact, and hence degrades the transfer efficiency.

The theory shows that the interaction of two intense waves by means of the Rayleigh resonance can result in efficient energy transfer from wave to the other. The example shows the coupling of two equal-energy laser pulses in potassium vapor. It was observed that up to 85% of the total energy in the two input pulses is contained in one of the output pulses.

From the foregoing description it will be apparent that a new discovery has been made and applied to in a laser beam combining system. Variations in the system, within the scope of the invention, will undoubtedly become apparent to those skilled in the art. Accordingly, the foregoing description should be taken as illustrated and not in a limiting sense.

APPENDIX

In this Appendix, we derive Eqs. (1–4) for the intensities of two nearly copropagating plane waves as they interact in a system of two-level atoms. The optical fields are assumed to be linearly polarized along the direction normal to the interaction plane and to have amplitudes $A_1$ and $A_2$, frequencies $\omega_1$ and $\omega_2$, and wave vectors $k_1$ and $k_2$, respectively. The total optical field is then written $$E(r,t) = [A_1(r)e^{i(k_1 \cdot r - \omega_1 t)} + a_2(r)e^{i(k_2 \cdot r - \omega_2 t)}] + c.c. \quad (A1)$$

The interaction of a single stationary atom with the two optical fields is described by the equations of motion for the elements of the density matrix:

$$\frac{d\rho_{ba}}{dt} = -(i\omega_o + 1/T_2)\rho_{ba} + i\frac{V_{ba}}{\hbar} w; \quad (A2)$$

$$\frac{dw}{dt} = -\frac{1}{T_1}(w - w_{eq}) - \frac{2i}{\hbar}[V_{ab}\rho_{ba} - V_{ba}\rho_{ab}]; \quad (A3)$$

where $\rho_{ba}$ describes the coherence between atomic states $|a\rangle$ and $|b\rangle$, w is the atomic inversion, $w_{eq}$ is the steady-state population inversion in the absence of applied fields, $T_2$ is the dipole-diphasing time, $T_1$ is the upper-state relaxation time, and $\omega_o$ is the atomic-resonance frequency. In the rotating-wave approximation, the atom-field interaction energy $V_{ab}$ is given by $$V_{ab}(r,t) = -\mu[A_1(r)e^{i(k_1 \cdot r - \omega_1 t)} + A_2(r)e^{i(k_2 \cdot r - \omega_2 t)}]. \quad (A4)$$

In order to solve Eqs. (A2) and (A3), we introduce the following Floquet expansions for $\rho_{ba}$ and w:

$$\rho_{ba}(r,t) = \left[\sum_{n=-\infty}^{\infty} d_n e^{in[(k_2 - k_1) \cdot r - \delta t]}\right] e^{i(k_1 \cdot r - \omega_1 t)}, \quad (A5)$$

$$w(r,t) = \sum_{n=-\infty}^{\infty} w_n e^{in[(k_2 - k_1) \cdot r - \delta t]} \quad (w_{-n} = w_n^*), \quad (A6)$$

where $\delta = \omega_2 - \omega_1$. After substituting Eqs. (A5–A6) into Eqs. (A2–A3), the coefficients of those terms having the same frequency dependence are equated, giving $$in\delta d_n = -(i\Delta_1 - 1/T_2)d_n + i\frac{\mu}{\hbar}[A_1 w_n + A_2 w_{n-1}]; \quad (A7)$$

$$in\delta w_n = \frac{2i}{\hbar}[\mu(d_n A_1^* + d_{n+1}A_2^*) - \mu(d_{-n}^* A_1 + d_{-(n-1)}^* A_2)] + \frac{(w_n + \delta_{n0})}{T_1}; \quad (A8)$$

where $\Delta_1 = \omega_1 - \omega_o$ and $\delta_{ij}$ is the Kronecker delta. We solve Eq. (A7) for $d_n$ and substitute the result into Eq. (A8) in order to obtain the following recursion relation for the coefficients $w_n$:

$$in\delta T_1 w_n = \quad (A9)$$
$$(1 + M_{1n}I_1 + M_{2n}I_2)w_n + L_n I_c w_{n-1} + L_{n+1}I_c^* w_{n+1} + \delta_{n0};$$

where $$L_n = \frac{1}{2I_s}\left\{\frac{1}{1 - i(\Delta_1 + n\delta)T_2} + \frac{1}{1 + i(\Delta_2 - n\delta)T_2}\right\}, \quad (A10)$$

$$M_{jn} = \quad (A11)$$
$$\frac{1}{2I_s}\left[\frac{1}{1 - i(\Delta_j + n\delta)T_2} + \frac{1}{1 + i(\Delta_j - n\delta)T_2}\right],$$

$$I_j = \frac{c}{2\pi}|A_j|^2, \quad j = 1,2 \quad (A12)$$

$$I_c = \frac{c}{2\pi}A_1^* A_2. \quad (A13)$$

where $\Delta_2 = \omega_2 - \omega_0$ and $I_s = c\hbar^2/8\pi|\mu|^2 T_1 T_2$. If we define $R_n \equiv w_n/w_{n-1}$, then, for $n \neq 0$, Eq. (A9) can be expressed as:

$$R_n = \frac{-L_n I_c}{1 + M_{1n}I_1 + M_{2n}I_2 - in\delta T_1 + L_{n+1}I_c^* R_{n+1}}. \quad (A14)$$

In order to obtain the terms in the nonlinear polarization that are phase-matched to either of the two incident waves, we must derive explicit expressions for $w_0$ and $w_1$. Iterating Eq. (A14) yields one relation between $w_0$ and $w_1$:

$$\frac{w_1}{w_0} = R_1 = -L_1 I_c F, \quad (A15)$$

where F is the continued fraction $$F = \cfrac{1}{1 + \Phi_1 - \cfrac{(L_2)^2|I_c|^2}{1 + \Phi_2 - \cfrac{(L_3)^2|I_c|^2}{1 + \Phi_3 - \cfrac{(L_4)^2|I_c|^2}{\ddots}}}} \quad (A16)$$

and $\Phi_n \equiv M_{1n}I_1 + M_{2n}I_2 - in\delta T_1$. Setting $n=0$ in Eq. (A9) yields a second relation between $w_0$ and $w_1$:

$$-(1 + M_{10}I_1 + M_{20}I_2)w_0 = L_0 I_c w_1^* + L_1 I_c^* w_1 + 1. \quad (A17)$$

Equations (A16-A17) can be solved for $w_0$ and $w_1$ to give:

$$w_0 = \frac{-1}{1 + \Lambda_1 I_1 + \Lambda_2 I_2 - 2|I_c|^2 Re\{(L_1)^2 F\}}; \quad (A18)$$

$$w_1 = \frac{L_1 I_c F}{1 + \Lambda_1 I_1 + \Lambda_2 I_2 - 2|I_c|^2 Re\{(L_1)^2 F\}}; \quad (A19)$$

where $\Lambda_j = 1/[1 + (\Delta_j T_2)^2]$, $j=1,2$. If we retain only those terms in Eq. (A5) that are phase-matched to either of the two incident waves, the expansion of $\rho_{ba}(r,t)$ becomes:

$$\rho_{ba}(r,t) = d_0 e^{i(k_1 \cdot r - \omega_1 t)} + d_1 e^{i(k_2 \cdot r - \omega_2 t)}, \quad (A20)$$

where $$d_0 = \frac{\mu T_2}{\hbar}\frac{\Delta_1 T_2 - i}{1 + (\Delta_1 T_2)^2}(A_1 w_0 + A_2 w_1^*) \quad (A21)$$

and $$d_1 = \frac{\mu T_2}{\hbar}\frac{\Delta_2 T_2 - i}{1 + (\Delta_2 T_2)^2}(A_1 w_1 + A_2 w_0). \quad (A22)$$

The variation in the amplitudes of the two waves as they propagate through a collection of stationary two-level atoms is described by Maxwell's wave equation:

$$\nabla^2 E(r,t) - \frac{1}{c^2}\frac{\partial^2 E(r,t)}{\partial t^2} = \frac{4\pi}{c^2}\frac{\partial^2 P(r,t)}{\partial t^2}; \quad (A23)$$

where P(r,t) is the polarization, which is given by $$P(r,t) = N\mu\rho_{ba}(r,t) + c.c. \quad (A24)$$

where N is the atomic number density. By combining Eqs. (A21-A25) and making the slowly-varying envelope approximation, we obtain the following coupled equations for the slowly varying field amplitudes:

$$\frac{dA_1}{dz'} = \frac{1}{2}(1 + i\Delta_1 T_2)N\sigma_0\Lambda_1(1 - L_1^* F^* I_2)w_0 A_1; \quad (A25)$$

$$\frac{dA_2}{dz'} = \frac{1}{2}[1 + i\Delta_2 T_2]N\sigma_0\Lambda_2(1 - L_1 F I_1)w_0 A_2. \quad (A26)$$

In Eqs. (A25-A26), $z' = z/\cos\theta$, where z is the axis along the bisector of wave vectors $k_1$ and $k_2$ and $2\theta$ is the crossing angle between the waves in the nonlinear medium (FIG. 1), $\sigma_o = 4\pi|\mu|^2 T_2\omega_o/\hbar c$ is the weak-field, line-center intensity absorption cross-section. In deriving Eqs. (A25-A26), we have assumed that $\delta << \omega_\phi$ and that the two waves are nearly copropagating in the nonlinear medium ($\sin\theta << 1$). The coupled Eqs. (1,2) for the intensities of the two waves follow directly from Eqs. (A25-A26).

REFERENCES 1. (a) C. Cohen-Tannoudji and S. Reynaud, "Dressed atom description of resonance fluorescence and absorption spectra of a multi-level atom in an intense laser beam," J. Phys. B 10, 345-363 (1977); "Modification of resonance Raman scattering in very intense laser fields," J. Phys. B 10, 365–383 (1977); (b) "Simultaneous saturation of two atomic transitions sharing a common level," J. Phys. B 10, 2311–2331 (1977); (c) E. Courtens and A. Szöke," Time and spectral resolution in resonance scattering and resonance fluorescence," Phys. Rev. A 15, 1588–1693 (1977); errata, 17, 2119 (1978).
2. B. R. Mollow, "Stimulated emission and absorption near resonance for driven systems," Phys. Rev. A 5, 2217–2222 (1972).
3. R. W. Boyd, M. G. Raymer, P. Narum, and D. J. Harter, "Four-wave parametric interactions in a strongly driven two-level system," Phys. Rev. A 24, 411–423 (1981).
4. M. Sargent III, "Spectroscopic techniques based on Lamb's theory," Phys. Rep. 43, 223–265 (1978).
5. S. E. Schwartz and T. Y. Tan, "Wave interactions in saturable absorbers," Appl. Phys. Lett. 10, 4–7 (1967).
6. J. H. Lee, J. J. Song, M. A. F. Scarparo, and M. D. Levenson, "Coherent population oscillations and hole burning observed in $Sm^{+2}$:$CaF_2$ using polarization spectroscopy," Opt. Lett. 5, 196–198 (1980).
7. J. J. Song, J. H. Lee, and M. D. Levenson, "Picosecond relaxation measurements by polarization spectroscopy in condensed phases, "Phys. Rev. A17, 1439–1447 (1978).
8. L. W. Hillman, R. W. Boyd, J. Krasinski, and C. R. Stroud, Jr., "Observation of a spectral hole due to population oscillations in a homogeneously broadened optical line," Opt. Commun. 45, 416–419 (1983).
9. M. S. Malcuit, R. W. Boyd, L. W. Hillman, J. Krasinski, and C. R. Stroud, Jr., "Saturation and inverse-saturation absorption line shapes in alexandrite," J. Opt. Soc. Am. B 1, 73–75 (1984).
10. F. Y. Wu, S. Ezekiel, M. Ducloy, and B. R. Mollow, "Observation of amplification in a strongly driven two-level atomic system at optical frequencies," Phys. Rev. Lett. 38, 1077–1080 (1977).
11. M. T. Gruneisen, K. R. MacDonald, and R. W. Boyd, "Induced gain and modified absorption of a weak probe beam in a strongly driven sodium vapor," J. Opt. Soc. Am. B 5, 123–129 (1988).
12. R. Gush and H. P. Gush, "Scattering of intense light by a two-level system," Phys. Rev. A 6, 129–140 (1972).
13. N. Tsukada, "Saturation effects of a two-level system in two rf fields," J. Phys. Soc. Jpn. 46, 1280–1287 (1979).
14. A. M. Bonch-Bruevich, T. A. Vartanyan, and N. A. Chigir, "Subradiative structure in the absorption spectrum of a two-level system in a biharmonic radiation field," Sov. Phys. JETP 50, 901–906 (1979).
15. N. Tsukada and T. Nakayama, "Modulation of optical bistability by an additional laser beam," Phys. Rev. A 25, 964–977 (1982).
16. G. I. Toptygina and E. E. Fradkin, "Theory of subradiative absorption structure in the interaction between two intense waves in a nonlinear medium," Sov. Phys. JETP 55, 246–251 (1982).
17. G. S. Agarwal and N. Nayak, "Multiphoton processes in two-level atoms in two intense pump beams," J. Opt. Soc. Am. B 1, 164–168 (1984).
18. L. W. Hillman, J. Krasinski, K. Koch, and C. R. Stroud, Jr., "Dynamics of homogeneously broadened lasers: higher-order bichromatic states of operation," J. Opt. Soc. Am. B 2, 211–217 (1985).
19. S. Chakmakjian, K. Koch, and C. R. Stroud, Jr., "Observation of resonances at sub-harmonics of the Rabi frequency in the saturated absorption of a 100% amplitude modulated laser beam," J. Opt. Soc. Am. B 5, 2015–2020 (1988).
20. See, for example, J. C. Walling, O. G. Peterson, H. P. Jenssen, R. C. Morris, and E. W. O'Dell, "Tunable alexandrite lasers," IEEE J. Quantum Electron. QE-16, 1302–1314 (1980).

We claim:

1. A method for combining laser beams in an atomic medium having at least two energy states one of which is a populated state which comprises the steps of interacting a plurality of laser beams in said medium which beams are tuned approximately to a frequency corresponding to the energy difference between said states and which differ in frequency by the inverse of the lifetime of the excited state, and delivery of one of said beam from said medium which has an energy greater than the energy of either of said beams.

2. The method according to claim 1 wherein further comprising the step of applying said beams to said medium and pulses.

3. The method according to claim 1 wherein said interacting step is carried out by copropagating said beam through said medium so that the intersect in said medium at an angle of at least 0.6°.

4. The method according to claim 1 wherein said medium is two-level atomic medium.

5. The method according to claim 1 wherein said medium is atomic vapor.

6. The method according to claim 1 wherein said vapor is provided by heating and vaporizing said atomic metal.

7. The method according to claim 6 wherein said medium is potassium vapor.

8. The method according to claim 1 wherein said beams are of approximately equal intensity.

9. A system for combining coherent optical energy which comprises an atomic medium having at least two states one of which is a populated state, means for providing a plurality of beams of said energy each having a frequency corresponding to approximately the energy of the transition between said states and which differ in frequency by the inverse of the lifetime of said excited state, means for transmitting said beams through said medium in sufficient proximity so that nonlinear interaction occurs therebetween, and means for deriving one of said beams from said medium to which energy of said other beam is transferred.

10. The system according to claim 9 wherein said atomic medium is an atomic vapor.

11. The system according to claim 10 wherein said vapor is an alkali vapor.

12. The system according to claim 11 wherein said alkali is potassium.

13. The system according to claim 9 wherein said providing means comprises means for generating said beams in pulses which are in coincidence with each other.

14. The system according to claim 9 wherein said transmitting means is operative to provide said beams for interaction at approximately equal intensity.

15. The system according to claim 9 wherein said transmitting means includes means for directing said beams so that they intersect in said medium at an angle exceeding 0.6°.

* * * * *